US008266402B2

(12) United States Patent
Garimella

(10) Patent No.: US 8,266,402 B2
(45) Date of Patent: *Sep. 11, 2012

(54) RETAINING DISK IDENTIFICATION IN OPERATING SYSTEM ENVIRONMENT AFTER A HARDWARE-DRIVEN SNAPSHOT RESTORE FROM A SNAPSHOT-LUN CREATED USING SOFTWARE-DRIVEN SNAPSHOT ARCHITECTURE

(75) Inventor: Neeta Garimella, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/208,500

(22) Filed: Aug. 12, 2011

(65) Prior Publication Data

US 2011/0296128 A1 Dec. 1, 2011

Related U.S. Application Data

(63) Continuation of application No. 11/684,495, filed on Mar. 9, 2007, now Pat. No. 8,028,136.

(51) Int. Cl.
*G06F 12/00* (2006.01)
*G06F 13/00* (2006.01)
*G06F 13/28* (2006.01)

(52) U.S. Cl. .................. 711/162; 711/E12.103
(58) Field of Classification Search .................. 711/162, 711/E12.103; 714/6, 11, 6.12, 15
See application file for complete search history.

(56) References Cited

U.S. PATENT DOCUMENTS

| 5,796,988 A | 8/1998 | Naidu et al. |
| 6,792,556 B1 | 9/2004 | Dennis |
| 7,039,662 B2 | 5/2006 | Kano et al. |
| 7,831,769 B1 * | 11/2010 | Wen et al. ............ 711/114 |
| 2003/0204597 A1 | 10/2003 | Arakawa et al. |
| 2004/0172577 A1 | 9/2004 | Tan et al. |

(Continued)

FOREIGN PATENT DOCUMENTS

EP 0664507 A2 7/1995

(Continued)

OTHER PUBLICATIONS

MSDN Microsoft; "Required Behaviors for Shadow Copy Providers"; retrieved from http://msdn.microsoft.com/en-us/library/aa384600(v=vs.85).aspx on Nov. 18, 2010; 2 pages.
Wikipedia; "Application Program Interface" retrieved from http://en.wikipedia.org/wiki/Application_programming_interface on Dec. 4, 2010; 5 pages.

(Continued)

*Primary Examiner* — Sheng-Jen Tsai
(74) *Attorney, Agent, or Firm* — Cantor Colburn LLP; Feb Cabrasawan

(57) ABSTRACT

A program, method and system are disclosed for managing a snapshot backup restore through a hardware snapshot interface, i.e. a hardware-driven snapshot restore, based upon a software-driven snapshot backup, e.g. created with software such as volume shadow copy service (VSS). When conventional hardware-driven snapshot restores are performed using a snapshot backup that was created using the VSS-based software such as copy services, data access issues can arise, due to the operating system assigning of a new disk signature to the disk being restored. This problem can be overcome by temporarily storing the original disk signature and then overwriting the new, incorrect disk signature after initializing the restore. This can ensure that the operating system identifies the source LUNs (and accordingly, the drive letter and mount points of the disk) using the same disk signature as before the restore.

20 Claims, 9 Drawing Sheets

U.S. PATENT DOCUMENTS

| | | |
|---|---|---|
| 2005/0004979 A1 | 1/2005 | Berkowitz et al. |
| 2005/0108292 A1 | 5/2005 | Burton et al. |
| 2005/0240584 A1 | 10/2005 | Patterson et al. |
| 2005/0240635 A1 | 10/2005 | Kapoor et al. |
| 2006/0069892 A1* | 3/2006 | Nakanishi et al. ............ 711/162 |
| 2006/0112219 A1 | 5/2006 | Chawla et al. |
| 2006/0218388 A1 | 9/2006 | Zur et al. |
| 2007/0220308 A1 | 9/2007 | Yeung et al. |
| 2008/0177801 A1 | 7/2008 | Garimella et al. |
| 2011/0173487 A1* | 7/2011 | Fujibayashi .................. 714/4.1 |

FOREIGN PATENT DOCUMENTS

| | | |
|---|---|---|
| JP | 3280147 A | 12/1991 |
| JP | 9280147 A | 12/1991 |
| JP | 2005301989 A | 10/2005 |
| JP | 2005310159 A | 11/2005 |

OTHER PUBLICATIONS

Wikipedia; Master Boot Record; retrieved from http://en.wikipedia.org/wiki/Master_boot_record on Dec. 8, 2010; 5 pages.

* cited by examiner

RETAINING DISK IDENTIFICATION IN OPERATING SYSTEM ENVIRONMENT AFTER A HARDWARE-DRIVEN SNAPSHOT RESTORE FROM A SNAPSHOT-LUN CREATED USING SOFTWARE-DRIVEN SNAPSHOT ARCHITECTURE

CROSS REFERENCE TO RELATED APPLICATIONS

This application is a continuation of U.S. patent application Ser. No. 11/684,495 filed Mar. 9, 2007, the contents of which are incorporated by reference herein in their entirety.

BACKGROUND OF THE INVENTION

1. Field of the Invention

This invention relates to data backups systems. Particularly, this invention relates to restoring data backups with hardware and software backup and restore processes such that consistency of disk signatures is maintained before and after restore.

2. Description of the Related Art

In a typical computer operating system, such as the Windows Operating System, every physical disk detected by the operating system is assigned a unique disk signature when the disk is first initialized. In particular, the drive letter and mount point assignments are keyed off the disk signature. Data backups, such as snapshot backups, are created and restored within this hardware.

At a high level, two kinds of snapshot technologies can be defined, hardware-based and software-based. Typically, a hardware-based snapshot may be created by the firmware embedded in the hardware. However, it is important to note that such backups may be requested by software (e.g., as the IBM Tivoli Storage Manager (TSM) for copy services product does). On the other hand, software-based snapshots may be created by the software, typically either by a file system or a logical volume manager. After a hardware-based snapshot restore, such as an "instant restore" in the TSM product family, of a Logical Unit Number (LUN) from a LUN created using a copy service, such as Volume Shadow Copy Services (VSS) snapshot, the operating system does not reassign driver letters and mount points that were originally assigned to the source disk. This, in turn, causes data access problems for the applications that store and access data on the volume after an instant restore. This problem is apparent after the system reboots, when the device scan and initialization takes place, but can also occur without a reboot. The cause of the problem is that the operating system identifies the source disk as a new LUN after the instant restore and assigns a new disk signature to the source LUN, while the old driver letter remains assigned to the disk signature prior to the restore.

VSS is a Microsoft platform that operates to assist driving both hardware-based as well as software-based snapshots from a single interface. The described inconsistency may be specific to the snapshot backups created using a software copy service that uses underlying VSS and does not exist if the snapshot is created outside of the VSS, for example using the user interface offered by the hardware vendor. It should be noted that VSS alone does not create a snapshot; an underlying snapshot service is also required.

However, the described problem occurs for the snapshots created using VSS (i.e., that are software-driven) because the VSS model requires snapshot to be made available (with an exception) to the Windows host system, known as import in VSS terminology. Backups performed by such software access both source and target LUNs at the same time, that are likely from the same host. In order to support simultaneous access, the software import process updates the disk signature on the snapshot backup LUN without user awareness. In short, a target LUN in hardware-driven snapshot is not identical to its source LUN and differs in disk signature. Some systems and techniques have been developed for managing data backups, particularly snapshot data backups.

U.S. Patent Application Publication No. 2003/0204597 by Hiroshi et al., published Oct. 30, 2003, discloses a storage system configured to provide a storage area to a host coupled to the storage system. This includes a first storage device of first type being configured to store data and provide one or more data-storage-related functions. A second storage device of second type is configured to store data and provide one or more data-storage-related functions. A virtual volume provides a storage location and being associated with at least one of the first and second storage devices. A database includes information relating to the one or more data-storage-related functions that the first and second storage devices are configured to perform. A first server is coupled to the first and second storage devices and having access to the database, the first server being configured to access the database in response to a data-storage-related-function request from the host involving at least one of the first and second storage devices. The database is accessed to determine whether or not the at least one of the first and second storage devices is capable of performing the request from the host. The first server further being configured to perform the request if the determination is negative or provide an instruction to the at least one of the first and second storage devices to perform to the request if the determination is positive.

U.S. Patent Application Publication No. 2005/0240635 by Vapoor et al., published Oct. 27, 2005, discloses methods and systems of snapshot management of a file system in a data storage system. To represent the snapshots, the invention maintains pointers to the root block pointer of each snapshot. When the active file system is modified, this invention avoids overwriting any blocks used by previous snapshots by allocating new blocks for the modified blocks. When the invention needs to put an established block in a new location, it must update a parent block to point to the new location. The update to the parent block may then require allocating a new block for the new parent block and so forth. Parts of the file system not modified since a snapshot remain in place. The amount of space required to represent snapshots scales with the fraction of the file system that users modify. To maintain snapshot integrity, this invention keeps track of the first and last snapshots that use each block in space map blocks spread throughout the file system data space. When users delete snapshots, this invention may use a background process to find blocks no longer used by any snapshot and makes them available for future use.

U.S. Patent Application Publication No. 2005/0004979 by Berkowitz et al., published Jan. 6, 2005, discloses a system and method of transporting volumes of information from one host computer system to another using point-in-time copies of LUNs but wherein the hardware provider does not necessarily understand the volume configuration of the data. The system and method involves an intermediate layer, i.e., a point-in-time copy interface layer that communicates with both a requesting host computer system and a hardware provider to enable the transfer of volumes of information without requiring that the hardware provider understand the volume information.

U.S. Patent Application Publication No. 2005/0108292 by Burton et al., published May 19, 2005, discloses an apparatus for managing incremental storage, including a storage pool management module that allocates storage volumes to a virtual volume. Also included is an incremental log corresponding to the virtual volume, which maps virtual addresses to storage addresses. The apparatus may also include a replication module that sends replicated data to the virtual volume and a policy management module that determines allocation criteria for the storage pool management module. In one embodiment, the incremental log includes a lookup table that translates read and write requests to physical addresses on storage volumes within the virtual volume. The replicated data may include incremental snapshot data corresponding to one or more primary volumes. The various embodiments of the virtual incremental storage apparatus, method, and system facilitate dynamic adjustment of the storage capacity of the virtual volume to accommodate changing amounts of storage utilization.

Existing systems and methods do not address the problem of inconsistent LUNs in a snapshot backup and restore, e.g. arising between a software snapshot and a hardware restore described above. Thus, there is a need in the art for systems and methods to ensure consistency of disk signatures before and after a hardware-based snapshot restore from a LUN created by a software-based snapshot. These and other needs are met by the present invention as detailed hereafter.

SUMMARY OF THE INVENTION

A program, method and system are disclosed for managing a snapshot backup restore through a hardware snapshot interface, i.e. a hardware-driven snapshot restore, based upon a software-driven snapshot backup, e.g. created with software such as volume shadow copy service (VSS). When conventional hardware-driven snapshot restores are performed using a snapshot backup that was created using the VSS-based software such as copy services, data access issues can arise, due to the operating system assigning of a new disk signature to the disk being restored. This problem can be overcome by temporarily storing the original disk signature and then overwriting the new, incorrect disk signature after initializing the restore. This can ensure that the operating system identifies the source LUNs (and accordingly, the drive letter and mount points of the disk) using the same disk signature as before the restore.

A typical embodiment of the invention comprises a computer program embodied on a computer readable medium, including program instructions for storing a disk signature of a disk before initialization of restoring a data backup to the disk, and program instructions for overwriting the disk signature of the disk after the initialization of restoring the data backup to the disk with the stored disk signature. Typically, the disk signature may be stored by saving a first sector of a logical unit number (LUN) of the disk in a cache memory or using an application programming interface (API) supporting a layout of the disk (e.g. an applicable Microsoft API). Further, the correct disk signature can then be used to determine a drive letter and mount points assigned to the disk such that overwriting the disk signature after initialization of restoring the data backup to the disk maintains the drive letter and the mount points assigned to the disk as before initialization of restoring the data backup.

In some embodiments, restoring the data backup may comprise a hardware-based snapshot restore. The hardware-based snapshot restore may be performed by a hardware controller of the disk, e.g. through the hardware user interface. On the other hand, the data backup may comprise a software-driven snapshot backup. For example, the snapshot backup may be generated by a software copy service, such as VSS. A typical embodiment of the invention can resolves access issues arising from restoring the data backup comprises a hardware-based snapshot restore (e.g. performed by a hardware controller of the disk) where the data backup comprises a VSS-based snapshot backup (e.g. generated by a software copy service).

Similarly, a typical method embodiment of the invention comprises the steps of storing a disk signature of a disk before the initialization of restoring a backup to the disk, and overwriting the disk signature of the disk after the initialization of restoring the backup to the disk with the stored disk signature. Method embodiments of the invention may be further modified consistent with system and/or program embodiments of the invention described herein.

Likewise, a typical backup system embodiment of the invention comprises a disk having a disk signature, a data backup for the disk, and a processor and memory for storing the disk signature of the disk before initialization of restoring a backup to the disk and for overwriting the disk signature of the disk after the initialization of restoring the backup to the disk with the stored disk signature. System embodiments of the invention may be further modified consistent with program and method embodiments of the invention described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Figure 1A:
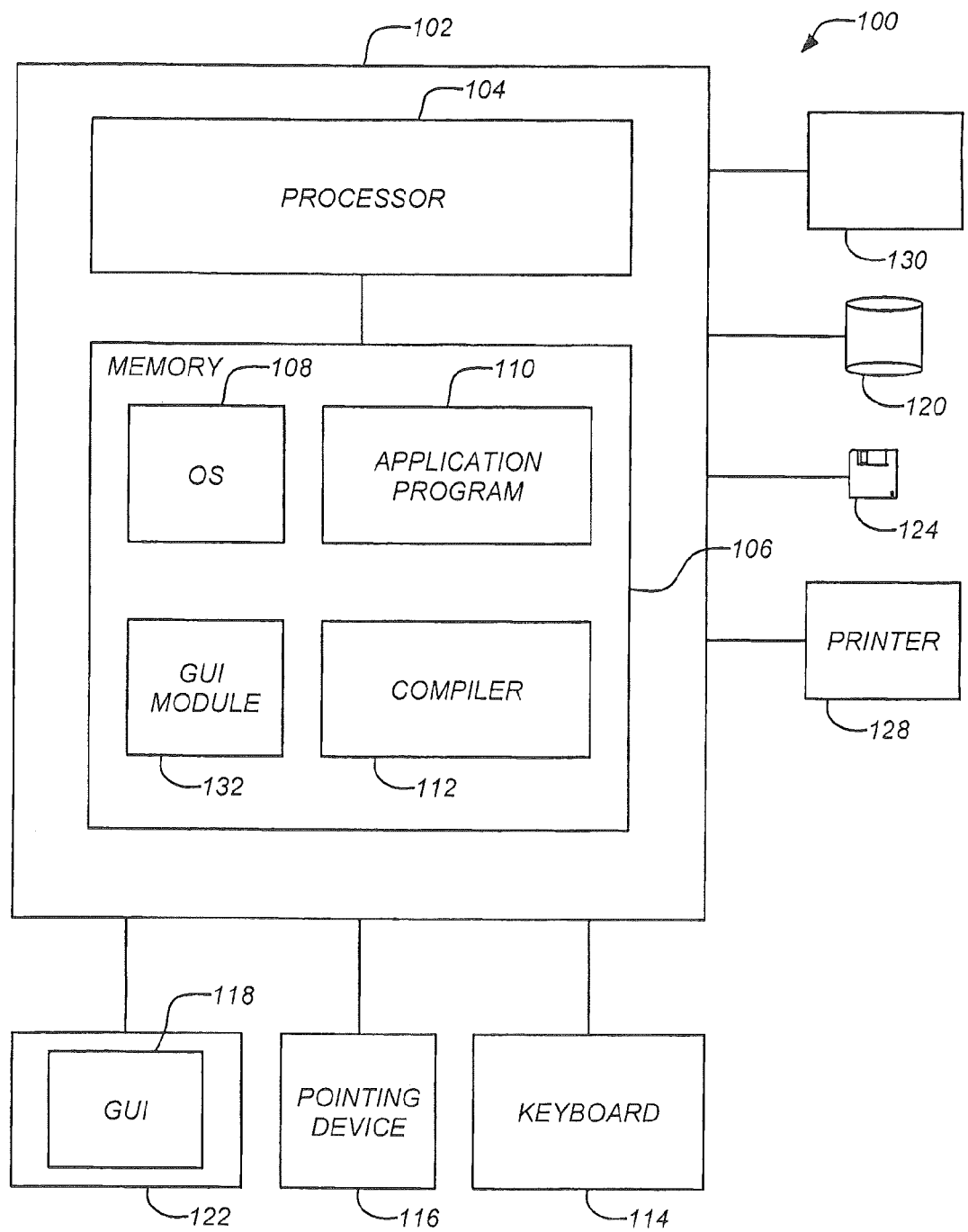
FIG. 1A illustrates an exemplary computer system that can be used to implement embodiments of the present invention.

As previously mentioned, VSS is a Microsoft platform that operates to assist driving both hardware as well as software based snapshot from a single interface. But, VSS can not create a snapshot by itself and requires a snapshot service to support it. Accordingly, the underlying technology may be hardware-based for both the backup as well as restore. (A typical VSS user may not even be aware of the underlying snapshot technology.) The previously described disk signature problem arises from a processing difference between the backup creation and restore path for a snapshot backup. Specifically, when TSM copy services creates a backup, the backup is processed through the VSS APIs to create the snapshot backup. This type of processing to create the backup may be termed software-driven. However, on the restore side, the snapshot has to be created outside of the VSS using APIs provided by the hardware, since VSS does have the capability to allow instant restore. This type of processing to restore a backup may be termed hardware-driven. So there exists a problem related to the disk signature that is solved by this invention.

Embodiments of the invention can operate as part of a distributed data backup system for a networked computer system that utilizes hardware-driven snapshot restore by hardware, such as the IBM Tivoli Storage Manager, from a snapshot created by software, such as Microsoft Volume Shadow Copy Services (VSS). Such software-driven snapshots maintain a different LUN from the LUN of the original disk that is being backed up. The LUN stores the disk signature, which assists the operating system to identify the disk being used. (A disk may be defined as any device that stores data.) The target LUN (the LUN that the software maintains to store backup data) is distinct from the source LUN (the LUN that represents the disk in use). This technique of maintaining multiple LUNs is necessary when such software copy services create the backups to allow both LUNs to be accessed simultaneously by the software. Otherwise, the copy service could not distinguish between the two sets of data if they were assigned the same LUN. When a snapshot-based restore is initiated by the hardware, the source LUN is replaced with the target LUN. However, when the source LUN is replaced with the target LUN, the operating system identifies the disk being restored as a new disk and assigns it a new disk signature. This problem occurs due to the use of multiple LUNs by the software-driven snapshot and their use with a hardware-driven snapshot restore.

In many computer systems, computer applications are programmed to store data at specific locations on disk. When a hardware-driven snapshot restore using a software-driven snapshot forces the operating system to create a new drive letter for an existing disk, the computer applications will not be able to access or store data at the correct location, and data access issues arise. Embodiments of the invention can make disk signatures before a restore consistent with disk signatures after the restore, to eliminate such data access issues.

2. Hardware Environment

FIG. 1A illustrates an exemplary computer system 100 that can be used to implement embodiments of the present invention. The computer 102 comprises a processor 104 and a memory 106, such as random access memory (RAM). The computer 102 is operatively coupled to a display 122, which presents images such as windows to the user on a graphical user interface 118. The computer 102 may be coupled to other devices, such as a keyboard 114, a mouse device 116, a printer, etc. Of course, those skilled in the art will recognize that any combination of the above components, or any number of different components, peripherals, and other devices, may be used with the computer 102.

Generally, the computer 102 operates under control of an operating system 108 (e.g. z/OS, OS/2, LINUX, UNIX, WINDOWS, MAC OS) stored in the memory 106, and interfaces with the user to accept inputs and commands and to present results, for example through a graphical user interface (GUI) module 132. Although the GUI module 132 is depicted as a separate module, the instructions performing the GUI functions can be resident or distributed in the operating system 108, a computer program 110, or implemented with special purpose memory and processors.

The computer 102 also implements a compiler 112 which allows one or more application programs 110 written in a programming language such as COBOL, PL/1, C, C++, JAVA, ADA, BASIC, VISUAL BASIC or any other programming language to be translated into code that is readable by the processor 104. After completion, the computer program 110 accesses and manipulates data stored in the memory 106 of the computer 102 using the relationships and logic that was generated using the compiler 112. The computer 102 also optionally comprises an external data communication device 130 such as a modem, satellite link, ethernet card, wireless link or other device for communicating with other computers, e.g. via the Internet or other network.

Instructions implementing the operating system 108, the computer program 110, and the compiler 112 may be tangibly embodied in a computer-readable medium, e.g., data storage device 120, which may include one or more fixed or removable data storage devices, such as a zip drive, floppy disc 124, hard drive, DVD/CD-rom, digital tape, etc., which are generically represented as the floppy disc 124. Further, the operating system 108 and the computer program 110 comprise instructions which, when read and executed by the computer 102, cause the computer 102 to perform the steps necessary to implement and/or use the present invention. Computer program 110 and/or operating system 108 instructions may also be tangibly embodied in the memory 106 and/or transmitted through or accessed by the data communication device 130. As such, the terms "article of manufacture," "program storage device" and "computer program product" as may be used herein are intended to encompass a computer program accessible and/or operable from any computer readable device or media.

Figure 1B:
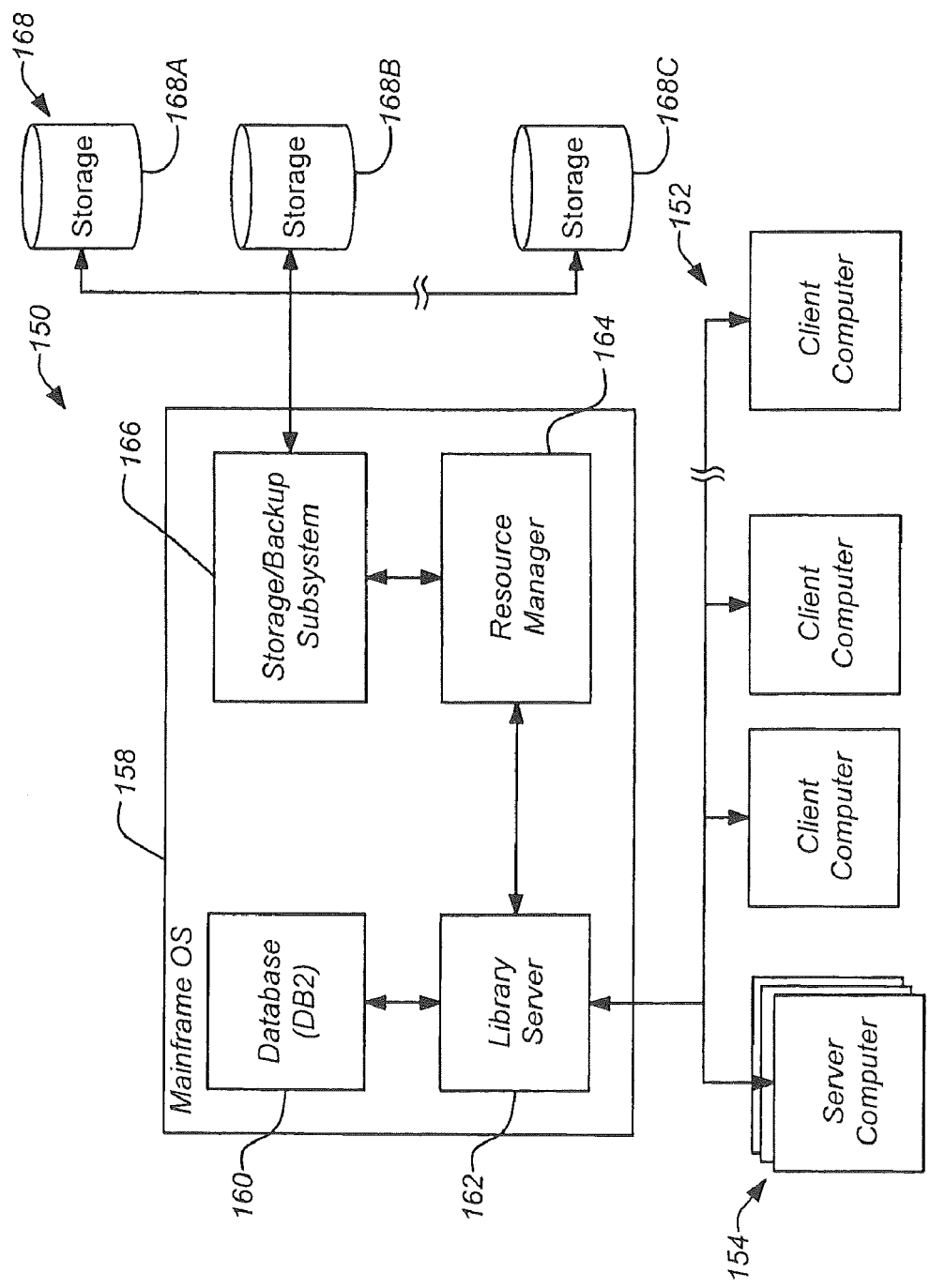
FIG. 1B illustrates a typical distributed computer system which may be employed in an typical embodiment of the invention.

FIG. 1B illustrates a typical distributed computer system 150 which may be employed in an typical embodiment of the invention. Such a system 150 comprises a plurality of computers 102 which are interconnected through respective communication devices 130 in a network 152. The network 152 may be entirely private (such as a local area network within a business facility) or part or all of the network 152 may exist publicly (such as through a virtual private network (VPN) operating on the Internet). Further, one or more of the computers 102 may be specially designed to function as a server or host 154 facilitating a variety of services provided to the remaining client computers 156. In one example one or more hosts may be a mainframe computer 158 where significant processing for the client computers 156 may be performed. The mainframe computer 158 may comprise a database 160 which is coupled to a library server 162 which implements a number of database procedures for other networked computers 102 (servers 154 and/or clients 156). The library server 162 is also coupled to a resource manager 164 which directs data accesses through storage/backup subsystem 166 that facilitates accesses to networked storage devices 168 comprising a SAN. Thus, the storage/backup subsystem 166 on the computer 162 comprise the backup server for the distributed storage system, i.e. the SAN. The SAN may include devices such as direct access storage devices (DASD) optical storage and/or tape storage indicated as distinct physical storage devices 168A-168C. Various known access methods (e.g. VSAM, BSAM, QSAM) may function as part of the storage/backup subsystem 166.

Embodiments of the present invention are generally directed to any software application program 110 that manages backup storage and restore processes for data stored on disk. The backups may be stored locally on the computer along with the original data or may be stored remotely, such as on a SAN connected over a network. The program 110 may operate within a single computer 102 or as part of a distributed computer system comprising a network of computing devices. The network may encompass one or more computers connected via a local area network and/or Internet connection (which may be public or secure, e.g. through a VPN connection).

Those skilled in the art will recognize many modifications may be made to this hardware environment without departing from the scope of the present invention. For example, those skilled in the art will recognize that any combination of the above components, or any number of different components, peripherals, and other devices, may be used with the present invention meeting the functional requirements to support and implement various embodiments of the invention described herein.

2. Consistent Snapshot Backup and Restore Processes

Although the results may be indistinguishable, there is a fundamental difference in how a hardware-driven snapshot backup and restore are performed compared with how a software based snapshot backup and restore are performed. This difference arises with respect to the how the LUNs of the source and backup are managed.

Figure 2A:
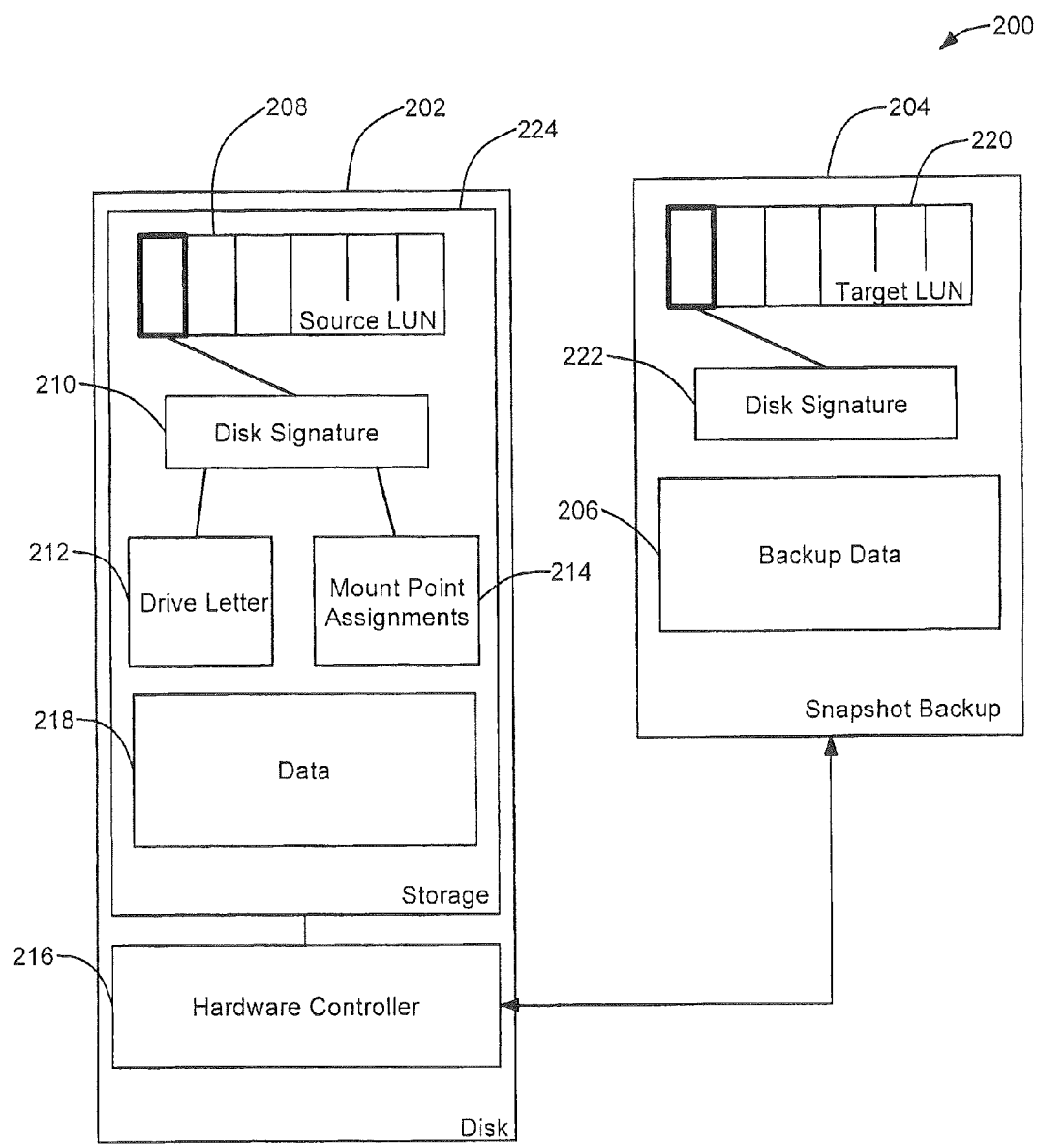
FIG. 2A illustrates a computer system generating a hardware-based snapshot backup and performing a hardware-based restore.

FIG. 2A shows an exemplary system 200 (such as may be operated within the hardware environment of FIGS. 1A and 1B), which includes the disk 202 that is generating a hardware-driven snapshot backup 204 of the data 218 in the storage 224. A hardware-driven snapshot backup and restore may be facilitated by the hardware controller/interface of the disk 202. As previously stated, the snapshot backup 204, which includes the backup data 206 (a copy of the data 218 of the source disk 202), may be stored locally or remotely (e.g. in a SAN) depending upon the particularly application and/or backup settings of the system 200. The disk 202 is identified by a LUN 208 that is unique among all the other storage devices that may be accessed by the operating system. Specifically, the operating system uses a disk signature 210 included in the LUN 208 (e.g., within a first block of the LUN) to identify the disk 202. From this disk signature 210, drive letter 212 and mount point assignments 214 are generated.

In this example, a hardware controller 216 of the disk 202 manages the creation of the snapshot backup 204 for the source data 218 on the disk 202. The target LUN 220, created through the hardware-driven process and stored with the backup data 206, is identical to the LUN 208 of the disk 202, i.e. the source LUN 208 for the hardware-driven snapshot backup 204. Accordingly, the target LUN 220 includes an identical disk signature 222. Consistency of the process is maintained when a hardware-driven restore is also performed with the hardware-driven snapshot backup 204. When the hardware-driven snapshot restore process is later performed, the source LUN 208 and source data 218 are simply replaced by the target LUN 220 and the backed up data 206. Effectively, the disk signature 210 remains intact (when overwritten by the identical backup disk signature 222) and consequently the drive letter 212 and mount point assignments 214 after the restore are consistent with those before the restore. Thus, after a hardware-driven backup and restore, there is no discernable difference to the operating system in accessing the disk 202, so the hardware-driven snapshot backup and hardware-driven restore gives rise to no data access issues. However, a snapshot that is software-driven by a service such as VSS, backup and software-driven restore does not maintain LUN consistency.

Figure 2B:
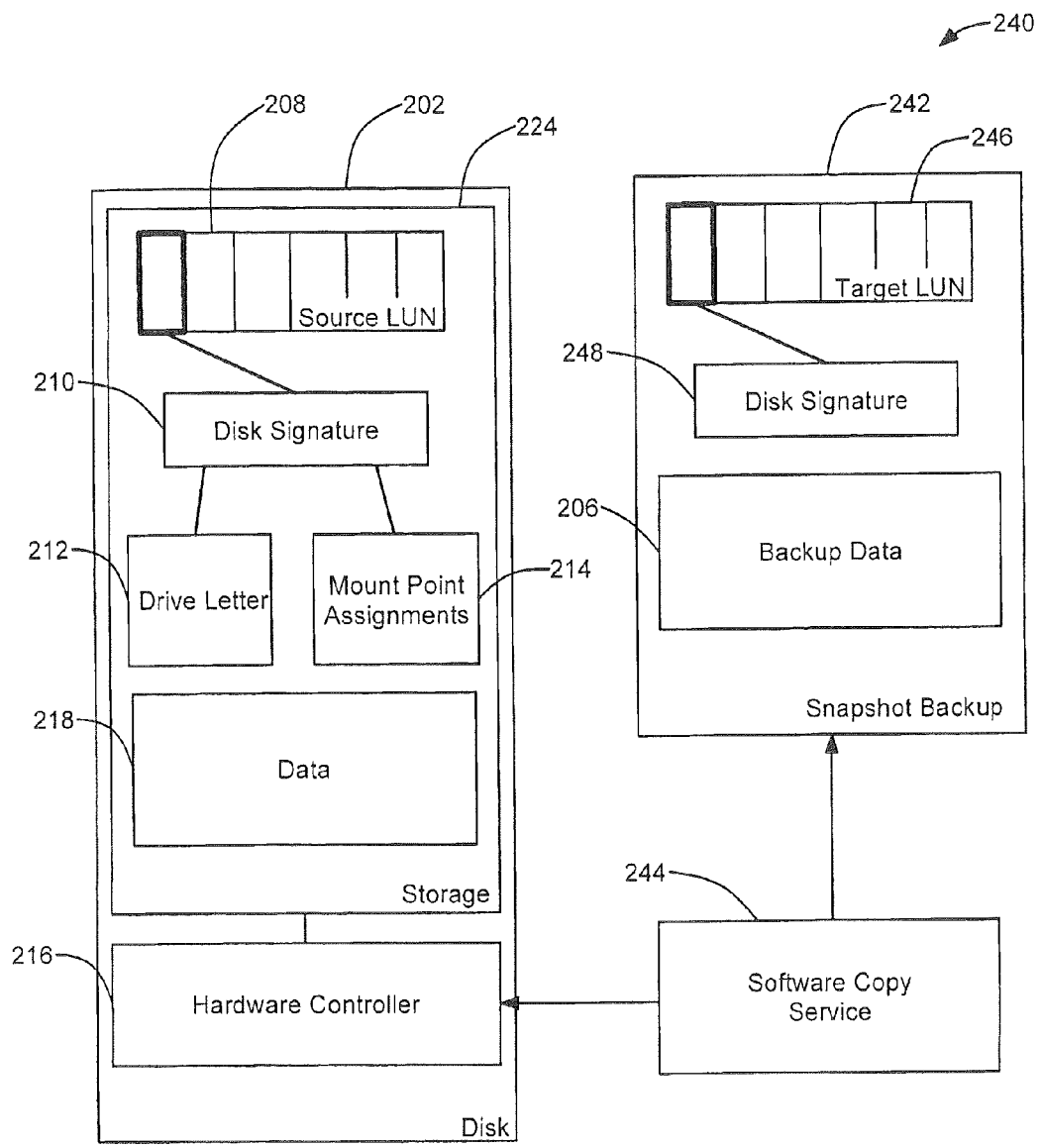
FIG. 2B illustrates a computer system generating a software-based snapshot backup and performing a software-based restore.

FIG. 2B illustrates an exemplary system 240 creating a software-driven snapshot backup 242 and performing software-driven restore. The disk 202, may be essentially identical to that described in the FIG. 2A. However in this case, the hardware controller 216 of the disk 202 is not used to create the snapshot backup 242 (although it is still employed to access the disk 202). Instead, the snapshot backup 242 is generated by a software copy service 244 (such as VSS on the operating system of the host computer). Because the software copy service 244 must simultaneously access both the disk 202 and the snapshot backup 242 (which may be located locally or remotely as with the previous example), as the snapshot backup 242 is being created, a distinct target LUN 246 is required for the snapshot backup 242 to avoid confusion with the source LUN 208 of the disk 202. Accordingly, the disk signature 248 of the snapshot backup 242 created by the software copy service 244 is different than the disk signature 210 of the source disk 202.

As long as the software copy service 244 that created the snapshot backup 242 is also used to restore the snapshot backup 242 to the disk 202 (or any such similar process employing simultaneous access in the restore), the disk signature 210 will be maintained. This is because the software copy service 244 does not overwrite the source LUN 208 with the different target LUN 246 as it performs the snapshot restore. (Note that this type of restore process should be understood by those skilled in the art although it is presented theoretically, as such a restore process is not presently available with VSS.) The original source LUN 208 (as well as the disk signature 210, drive letter 212 and mount point assignments 214) is maintained during the software-driven restore. Thus, it can be seen how consistent use of the same process type, hardware or software, in creating and restoring the snapshot backup operate properly. However, the differences in LUN handing between hardware and software based snapshot backup and restore processes create problems when hardware and software processes are mixed between the backup and restore.

3. Mixing Hardware and Software Snapshots and Restores

Figure 3:
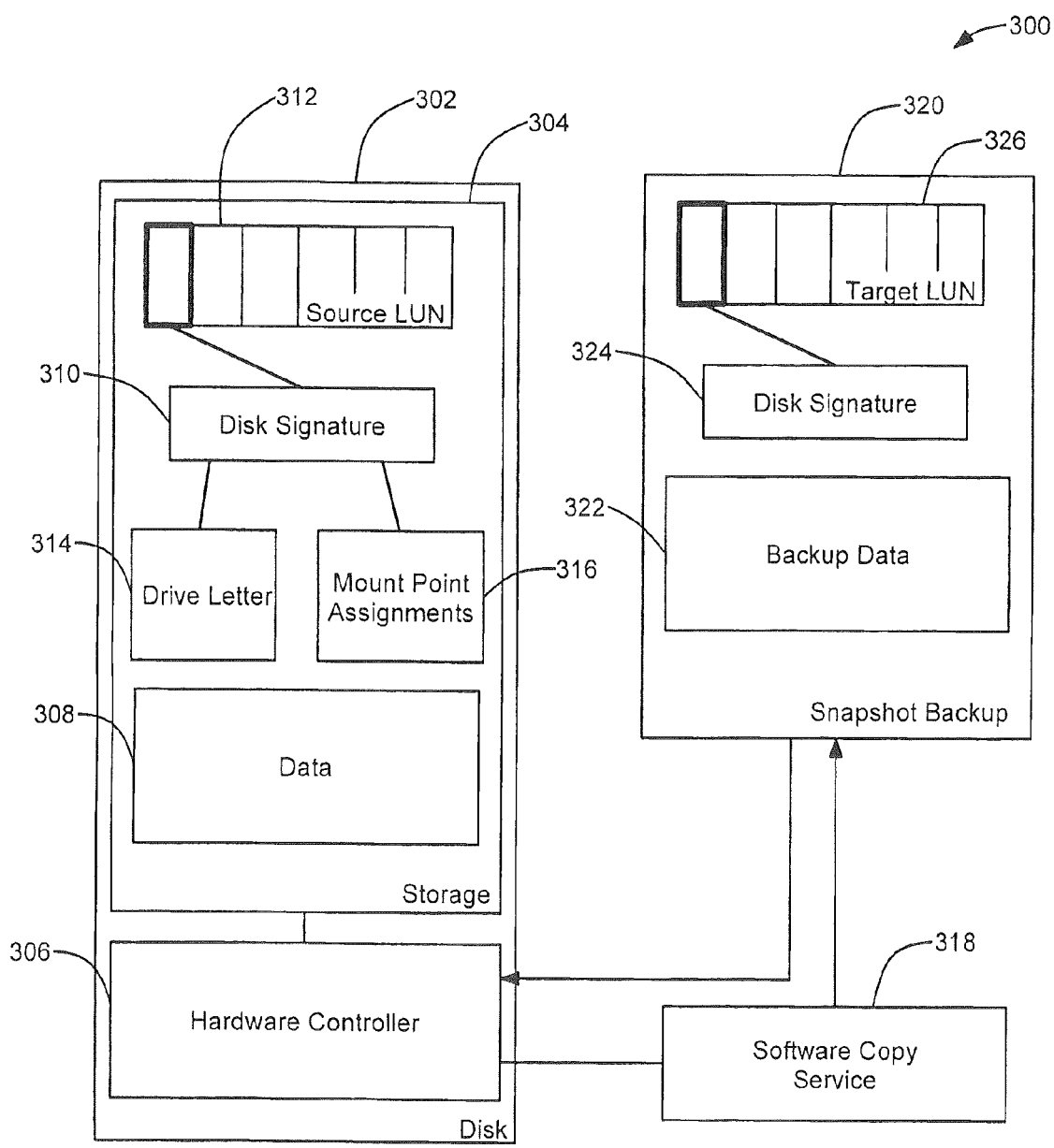
FIG. 3 illustrates a computer system performing a hardware-based snapshot restore using a software-based snapshot.

FIG. 3 illustrates a computer system 300 performing a hardware-driven snapshot restore using a software-driven snapshot. The system 300 essentially appears as that of FIG. 2B. A disk 302 comprises storage 304 and a hardware controller 306. The storage 302 holds that data 308 which is identified to the system through the disk signature 310 within the LUN 312. The disk signature 310 is used to derive the drive letter 314 and the mount point assignments 316 to the system. The drive letter 306 and mount point assignments 308 are significant because they are used when a user attempts to locate data on the disk 302. The snapshot backup 320 is generated by software copy service 318 in this scenario (just as was described in FIG. 2B). The target LUN 326, which is distinct from the source LUN 312 (to allow simultaneous access), may be accessed by the operating system where software 318 is executing. Thus, the backup data 322 of the source data 308 is stored in the snapshot backup 320 having a different disk signature 324 (derived from the target LUN 326) than that of the source disk 302.

The snapshot backup 320 restore process, on the other hand, is now performed by the software using the interfaces of hardware disk controller 306. Thus, this process will overwrite the source LUN 312 with the target LUN 326 (as previously described in FIG. 2A). But because the two LUNs 312, 326 are different as a result of the software-driven snapshot backup process, the disk 302 will be given the different signature 324 of the snapshot backup 320 which will also yield assignment of a different drive letter and mount point assignments. Accordingly, previously set software and hardware will be unable to locate the disk 302 after the restore because these elements will be seeking the old drive letter 314.

As described in the following section, embodiments of the present invention can overcome this incompatibility by a process of caching the LUN (or at least the disk signature portion of the LUN) of the source drive and overwriting the software-driven target LUN after it has been copied to the source drive during the restore process.

It is also worth mentioning that the reverse scenario of attempting to perform a software-driven snapshot restore with a hardware-driven snapshot backup will fail from the outset. This is because the hard-based snapshot backup will have a LUN (and disk signature and mount point assignments) identical with that of the source disk (e.g. as described in FIG. 2A. A software-driven restore operation will be unable to act on such a snapshot backup because it will not be able to simultaneously access a backup and a source disk having identical LUNs.

Figure 4A:
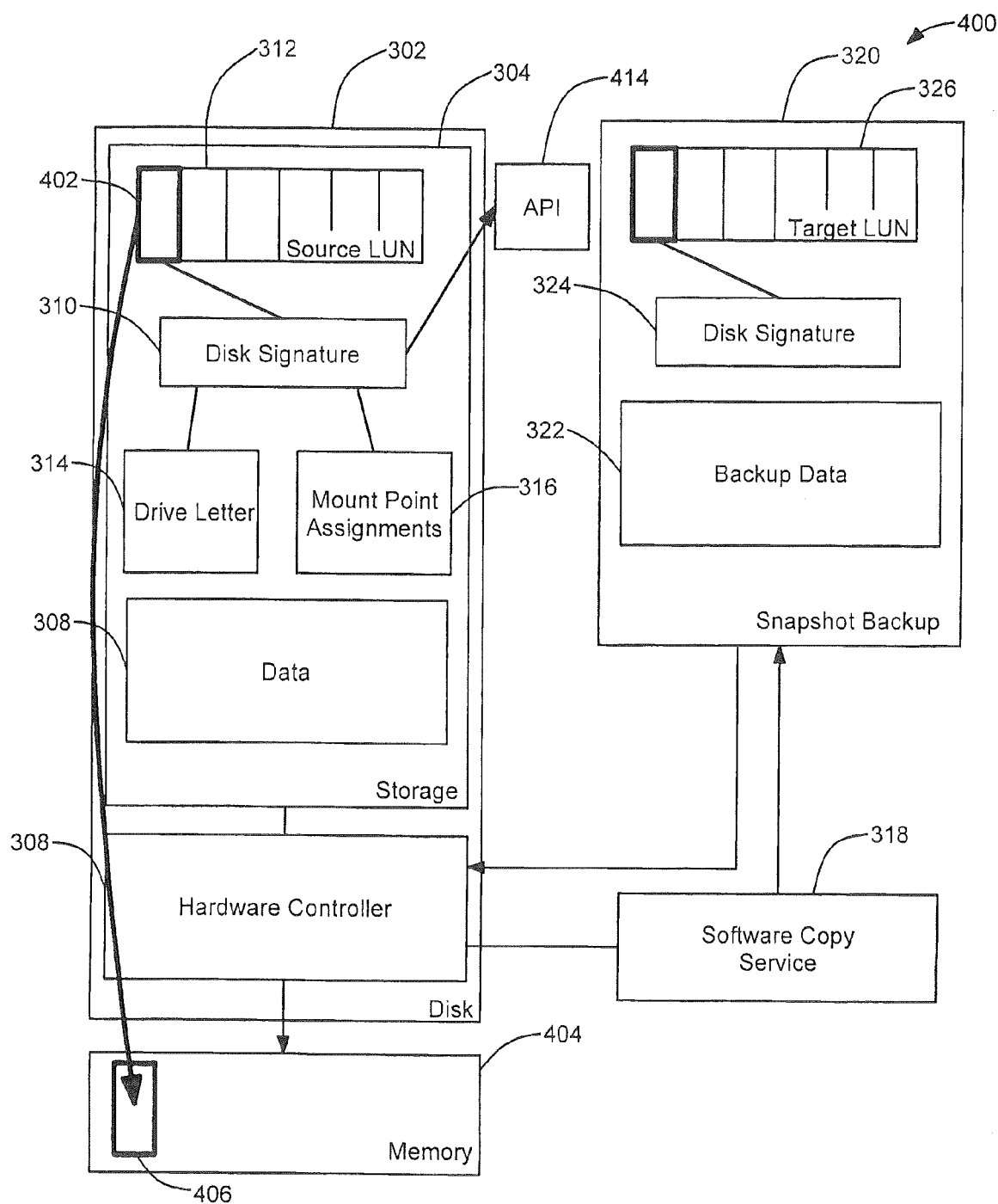
FIG. 4A illustrates the first stage of an exemplary embodiment of the invention, where the first sector of the LUN is cached to memory, implemented on a computer system performing a hardware-based snapshot restore using a software-based snapshot.

4. Caching to Accommodate Incompatibility of Software-Driven Snapshot and Hardware-Driven Snapshot Restore FIG. 4A illustrates the first stage process for an embodiment of the invention where a first sector 402 of the source LUN 312 may be cached to a memory 404 prior to initialization of the snapshot restore. It may be implemented on a computer system 400 performing a hardware-driven snapshot restore using a software-driven snapshot. The basic system 400 elements and operation is just as described in FIG. 3. However in this case, prior to initializing the hardware-driven snapshot restore, the disk signature 402 located in a first sector (512 bytes) of the source LUN 312 is stored (cached) in a memory 404. Caching and restoring of the disk signature 402 may be directed by the backup software operating on the local or distributed computer system or as a function of the hardware controller of the disk or the software copy service or any other component involved in the backup and restore system. The memory 404 may be cache memory of the local system, on another storage device (e.g. disk), or any other suitable storage location. In any case the cached first sector memory 406 is unaffected by the restore procedure, and thus the data is the same before and after restore is performed on the disk 302.

It should also be noted that in an alternate but similar manner, some application programming interfaces (APIs) have been developed that are capable of reading and writing disk signatures directly, e.g. from Microsoft. Accordingly, any suitable API 414 may also be employed to store (and later overwrite) the disk signature 310 of the source LUN 312. However, an applicable API 414 must provide support for the layout of the disk 302 to operate properly. (In this case the API 414 may employ the same or similar memory 404 to temporarily store the disk signature 310.)

Figure 4B:
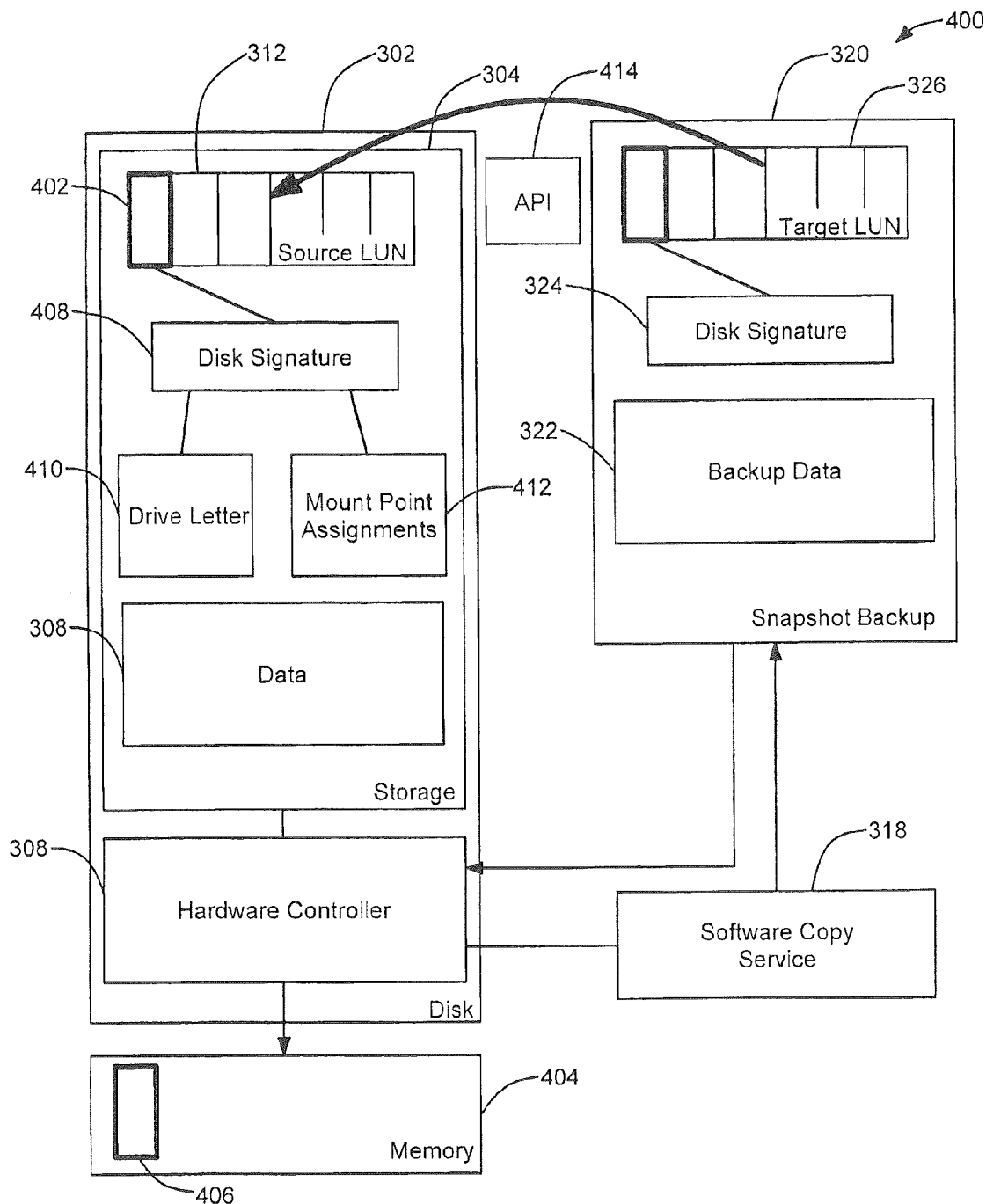
FIG. 4B illustrates the next stage of an exemplary embodiment of the invention, where the target LUN replaces the source LUN, implemented on a computer system performing a hardware-based snapshot restore using a software-based snapshot.

FIG. 4B illustrates the next stage of an exemplary embodiment of the invention. At this point, the hardware-driven snapshot restore of the software-driven snapshot backup 320 is initialized. The hardware controller 308 of the disk 302 overwrites the storage 304 with the data 308 with the backup data 322 along with overwriting the source LUN 312 with the different target LUN 326. Overwriting the source LUN 312 with the different target LUN 326 has the effect of introducing a new disk signature 408, drive letter 410 and mount point assignments 412 to the disk 302. This stage of the process is simply an ordinary hardware-driven restore, except that the previous first sector 402 of the source LUN 312 is stored in cache memory 404 in order to retain the prior disk signature 310.

Figure 4C:
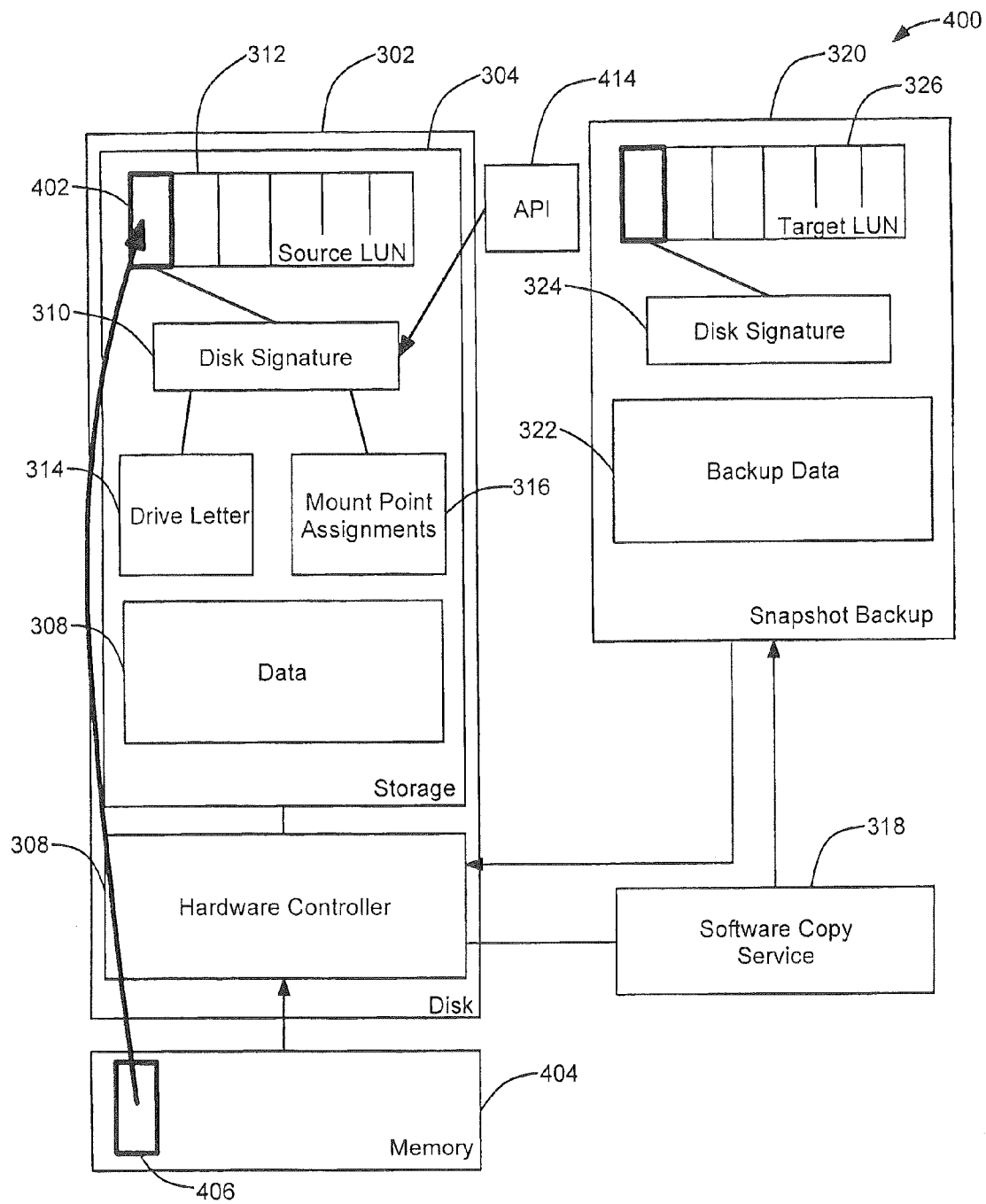
FIG. 4C illustrates the last stage of an exemplary embodiment of the invention, where the first sector of the LUN is overwritten with the cached first sector of the LUN before the restore, implemented on a computer system performing a hardware-based snapshot restore using a software-based snapshot.

FIG. 4C illustrates the last stage of the exemplary embodiment of the invention, where the first sector 402 of the source LUN 312 is overwritten with the cached first sector 406 of the source LUN 312 taken before initializing the hardware-driven restore of the software-driven snapshot backup 320. The disk signature 310 of the disk 302, along with the corresponding drive letter 314 and mount point assignments 316, is now the same as it was before the hardware-driven restore was initialized. As previously mentioned, a suitable API 414 may alternately be used to now overwrite the disk signature 310 of the source LUN 312 in a similar manner.

This restoration of the disk signature allows computer programs to maintain data access consistency as will be understood by those skilled in the art. For example, when a computer application attempts to locate A:\directory\file.txt, it will now be able to find it after the restore because the drive letter is the same as it was before the restore. It should also be noted that although the process has been described as caching only the first sector of the LUN, the process may alternately cache any other portion of the disk data as necessary to preserve the disk signature and maintain consistency of the disk reference before and after the snapshot backup restore without departing from the scope of the invention.

Figure 5:
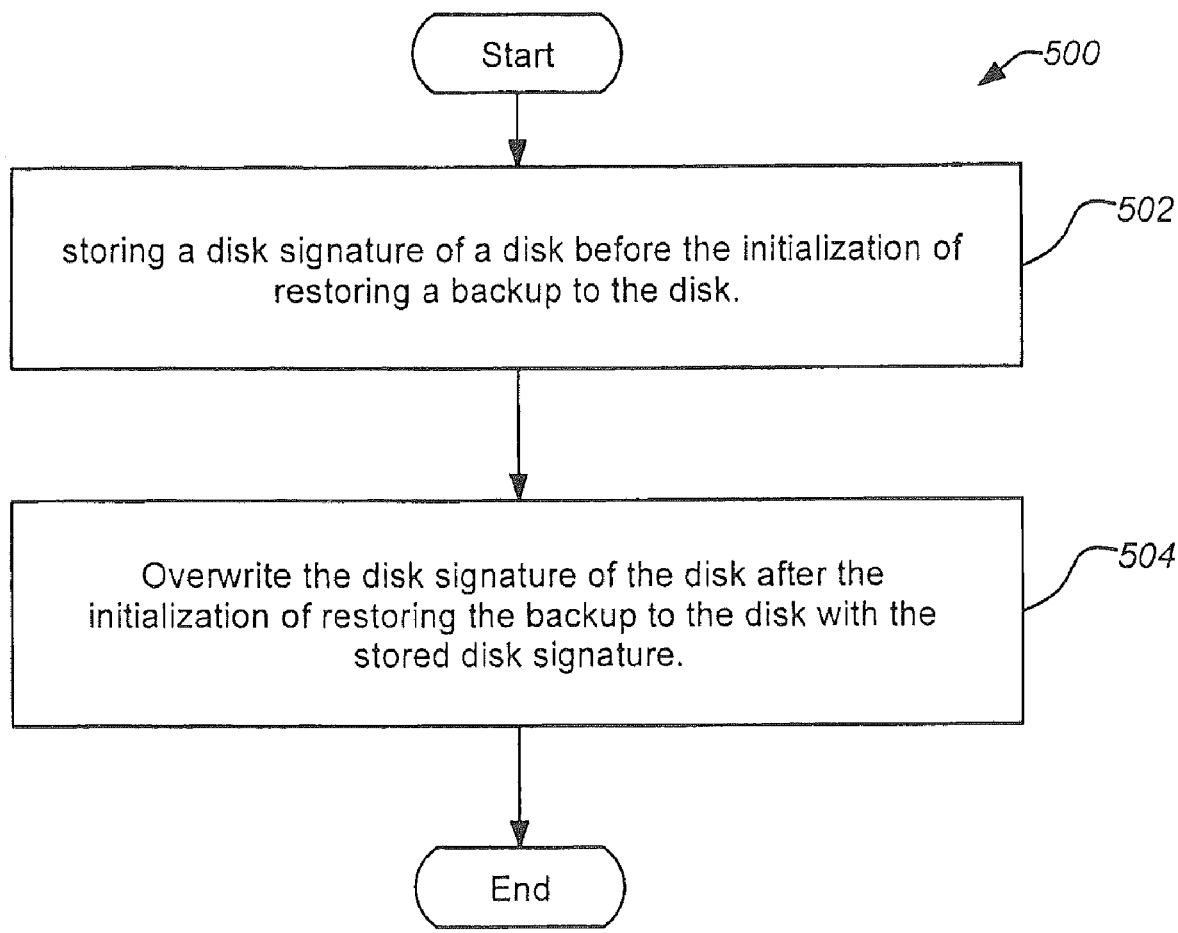
FIG. 5 is a flowchart of an exemplary method of the invention.

FIG. 5 is a flowchart of an exemplary method 500 of the invention. The method 500 begins with the operation 502 of storing a disk signature of a disk before the initialization of restoring a backup to the disk. Next, in operation 504 the disk signature of the disk is overwritten after the initialization of restoring the backup to the disk with the stored disk signature. This can be achieved by replacing the new first sector of the LUN with the saved first sector of the old LUN. The method 500 may by further modified consistent with the program and system embodiments previously described.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A computer program embodied on a computer readable medium, comprising:
    program instructions for storing a source disk signature of a source disk before initialization and restoring of a data backup to the source disk, the data backup comprises a snapshot backup including a backup disk signature that is different from the source disk signature; and
    program instructions for overwriting the backup disk signature on the source disk after the initialization and restoring of the data backup to the source disk with the stored source disk signature;

wherein restoring the snapshot backup introduces the backup disk signature to the source disk before the stored source disk signature is restored to the source disk, and further wherein the source disk signature is assigned to the source disk such that overwriting the backup disk signature after initialization and restoring the data backup to the source disk maintains the source disk signature, and a logical unit number (LUN) of the source disk determines mount points assigned to the source disk.

2. The computer program of claim 1, wherein the source disk signature is stored by saving a first sector of a LUN of the source disk in a cache memory.

3. The computer program of claim 1, wherein a LUN of the source disk further determines a drive letter assigned to the source disk, and the drive letter and the mount points assigned to the source disk are maintained before initialization and restoring the data backup.

4. The computer program of claim 1, wherein the source disk signature is stored and overwritten by an application programming interface (API) supporting a layout of the source disk.

5. The computer program of claim 1, wherein restoring the data backup comprises a hardware-driven snapshot restore.

6. The computer program of claim 1, wherein the data backup comprises a software-driven snapshot backup.

7. The computer program of claim 6, wherein the software-driven snapshot backup is generated by a software copy service.

8. The computer program of claim 1, wherein restoring the data backup comprises a hardware-driven snapshot restore and the data backup comprises a software-driven snapshot backup.

9. The computer program of claim 8, wherein the hardware-driven snapshot restore is performed by a hardware controller of the source disk and the software-driven snapshot backup is generated by a software copy service.

10. A method comprising the steps of:
storing a source disk signature of a source disk before initialization and restoring of a backup to the source disk, a data backup comprises a snapshot backup including a backup disk signature that is difference from the source disk signature; and
overwriting the backup disk signature on the source disk after the initialization and restoring of the backup to the source disk with the stored source disk signature;
wherein restoring the snapshot backup introduces the backup disk signature to the source disk before the stored source disk signature is restored to the source disk, and further wherein the source disk signature is assigned to the source disk such that overwriting the backup disk signature after initialization and restoring the data backup to the source disk maintains the source disk signature, and a logical unit number (LUN) of the source disk determines mount points assigned to the source disk.

11. The method of claim 10, wherein the source disk signature is stored by saving a first sector of a LUN of the source disk in a cache memory.

12. The method of claim 11, wherein the LUN of the source disk further determines a drive letter assigned to the source disk and the drive letter and the mount points assigned to the source disk are maintained before initialization and restoring the data backup.

13. The method of claim 10, wherein the source disk signature is stored and overwritten by an application programming interface (API) supporting a layout of the source disk.

14. The method of claim 10, wherein restoring the data backup comprises a hardware-driven snapshot restore.

15. The method of claim 10, wherein the data backup comprises a software-driven snapshot backup.

16. The method of claim 15, wherein the software-driven snapshot backup is generated by a software copy service.

17. The method of claim 10, wherein restoring the data backup comprises a hardware-driven snapshot restore and the data backup comprises a software-driven snapshot backup.

18. The method of claim 17, wherein the hardware-driven snapshot restore is performed by a hardware controller of the source disk and the software-driven snapshot backup is generated by a s software copy service.

19. A backup system, comprising:
a source disk having a source disk signature;
a data backup for the source disk, the data backup comprising a snapshot backup including a backup disk signature that is different from the source disk signature; and
a processor and memory for storing the source disk signature of the source disk before initialization and restoring of the data backup to the source disk and for overwriting the backup disk signature on the source disk after the initialization and restoring of the data backup to the source disk with the stored source disk signature;
wherein restoring the snapshot backup introduces the backup disk signature to the source disk before the stored source disk signature is restored to the source disk, and further wherein a disk signature is assigned to the source disk such that overwriting the backup disk signature after initialization and restoring the data backup to the source disk maintains the source disk signature, and a logical unit number (LUN) of the source disk determines mount points assigned to the source disk.

20. The backup system of claim 19, wherein the data backup comprises a hardware-driven snapshot restore and the data backup comprises a software-driven snapshot backup.

* * * * *